United States Patent [15] 3,665,467
Haroules et al. [45] May 23, 1972

[54] CLEAR AIR TURBULENCE DETECTOR

[72] Inventors: George G. Haroules, Lexington; Wilfred E. Brown, III, Acton; Harold I. Ewen, Weston; Arthur E. Lilley, Belmont; Ralph D. Kodis, Newton, all of Mass.

[73] Assignee: The United States of America as represented by the Administrator of the National Aeronautics and Space Administration

[22] Filed: Nov. 19, 1969

[21] Appl. No.: 877,990

[52] U.S. Cl. .......................... 343/100 ME, 73/355, 325/363, 343/112 D
[51] Int. Cl. ............................................................ G01w 1/00
[58] Field of Search ............... 343/100 ME; 73/355; 325/363

[56] References Cited

UNITED STATES PATENTS

| | | |
|---|---|---|
| 3,056,958 | 10/1962 | Anderson .................. 343/100 ME UX |
| 3,028,596 | 4/1962 | McGillem et al. .............. 343/100 ME |
| 3,380,055 | 4/1968 | Fow et al. ........................ 343/100 ME |
| 3,465,339 | 9/1969 | Marner ............................ 343/100 ME |

Primary Examiner—Samuel Feinberg
Assistant Examiner—Richard E. Berger
Attorney—Herbert E. Farmer, John R. Manning and Garland T. McCoy

[57] ABSTRACT

This disclosure describes an apparatus for warning the pilot of an aircraft of a region of clear air turbulence. A multi-channel radiometric sensor mounted on the aircraft detects both the ambient temperature of the air and any temperature anomaly that is present along the forward flight path. In those cases where temperature anomalies are associated with the presence of a clear air turbulence region, the invention provides means for remotely sensing these temperature anomalies through the application of a unique radiometric technique. By the detection of difference temperatures between a minimum of two channels, the invention provides a means for indicating the existence of a temperature anomaly indicative of clear air turbulence region. In addition, the distance from the aircraft to the anomalous temperature region is directly determined from the output indication of the radiometric sensor channels. The distance between the clear air turbulence region and the aircraft is determined by utilization of at least two observing frequencies which have known absorption coefficients of different values.

7 Claims, 6 Drawing Figures

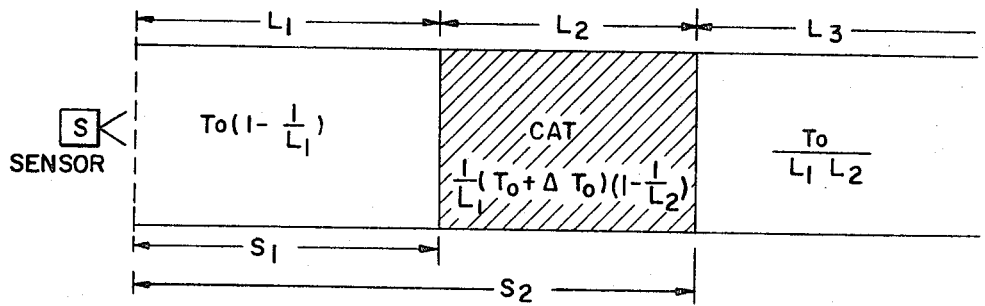
FIG.I.
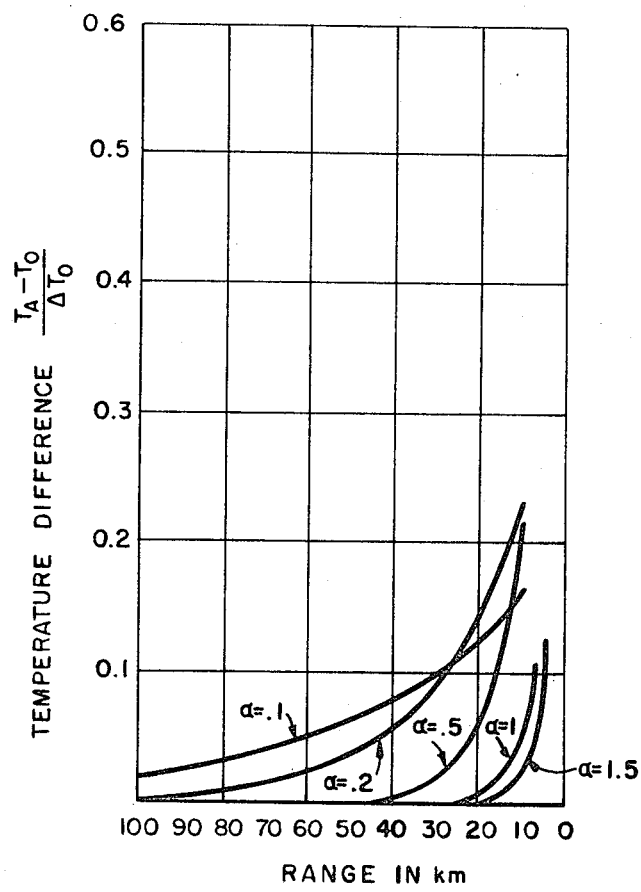
FIG.2.
INVENTORS
George G. Haroules
Wilfred E. Brown III
Harold I. Ewen
Arthur Edward Lilley &
Ralph D. Kodis
BY John R. Manning ATTORNEYS

CLEAR AIR TURBULENCE DETECTOR

ORIGIN OF THE INVENTION

The invention described herein may be manufactured and used by or for the United Stages Government for governmental purposes without payment of any royalty thereon or therefor.

BACKGROUND OF THE INVENTION

Clear air turbulence (CAT) regions are a hazard to modern aircraft because the effects of moving through a CAT region may result in severe structural damage to the aircraft. In fact, passing through a CAT region may even result in the loss of the aircraft. CAT can be generated by atmospheric processes that are markedly different from each other in terms of their physical and dynamic characteristics. Some of these atmospheric processes are predictable and, consequently, CAT caused by them is detectable. For example, CAT associated with mountain waves is predictable from the data obtained and disseminated by weather stations. Similarly, CAT due to strong vertical convection currents usually found in the proximity of large cumulus clouds is detectable using weather radar. However, other CAT regions are not easily detectable. For example, the CAT which occurs in jet stream frontal regions is not easily detectable.

It will be appreciated from the foregoing description of the effects of CAT that it is desirable to provide a system that detects CAT regions and warns an aircraft pilot of their existence so that the pilot can take evasive action.

Therefore, it is an object of this invention to provide a new and improved apparatus for detecting clear air turbulence regions by detection of their related temperature anomaly.

It is also an object of this invention to provide an apparatus for warning a pilot of a clear air turbulence region that is suitable for use on aircraft traveling faster than the speed of sound.

It is another object of this invention to provide an apparatus for warning a pilot of a clear air turbulence region that is low in power consumption, low in complexity and low in weight, making it suitable for use on modern aircraft.

It is still another object of this invention to provide an apparatus for measuring the range to and temperature anomaly associated with a clear air turbulence region, interpreting the measured data, and warning the pilot of the occurrence of the clear air turbulence region in sufficient time for the pilot to avoid the clear air turbulence region.

SUMMARY OF THE INVENTION

In accordance with a principle of this invention, an apparatus for detecting atmospheric temperature anomalies associated with regions of clear air turbulence is provided. The apparatus comprises a multifrequency radiometric receiver, an antenna, and a signal processing system. The radiometric sensor by means of its antenna detects a temperature difference in the form of a microwave signal when the sensor system is mounted in an aircraft and the aircraft is moving in a forward direction toward the temperature anomaly. The system uses two or more different frequencies that are associated with the different absorption coefficients of gases in the atmosphere. The technique will also detect density anomalies when there is no temperature anomaly. Utilizing the characteristic of molecular resonance in terms of absorption coefficients over small bandwidths, allows the sensor to simultaneously observe the thermal radiation of the atmosphere over a large dynamic range of absorption coefficients determined by the appropriate selection of frequency. The use of atmospheric oxygen as such a gas is advantageous because of its well defined molecular resonances and line structure. That is, at a particular flight altitude a desired absorption coefficient in the range from 0.5 db/km to several db/km can be chosen by merely selecting the frequency of observation.

The radiometric sensor looking forward along the flight path detects temperatures consisting of two components — the ambient temperature, $T_o$, along the flight path, plus a difference temperature, $\Delta T_c$, relative to the ambient temperature. The values of $\Delta T_c$ observed at frequencies with different absorption coefficients differ in magnitude, depending on the horizontal range to the CAT region. The lower the absorption coefficient, the greater the range at which a $\Delta T_c$ is detected. The higher the absorption coefficient, the shorter the range. As the aircraft approaches the CAT region, the frequency of observation corresponding to the highest absorption coefficient ultimately provides a larger value of $\Delta T_c$ than all other frequencies of observation, even though the frequency corresponding to the lowest absorption coefficient provides the first detection of a temperature difference $\Delta T_c$ relative to the ambient.

An appropriate indicating means is connected to the output of the multifrequency sensor to provide the pilot with an indication of the time before encountering the region of clear air turbulence. The indicating means also indicates the distance from the aircraft to the region of clear air turbulence.

In accordance with a still further principle of this invention, the multifrequency radiometric sensor is balanced by noise injection so that only temperature differences are sensed when it is being used to determine the range to the clear air turbulence. That is, the radiometer channels are adapted to sense only temperature differences at the frequencies of operation of each of the channels, not temperatures on an absolute scale.

It will be appreciated by those skilled in the art and others that the invention is a rather uncomplicated apparatus for detecting regions of atmospheric temperature anomalies along the flight path of an aircraft. A multifrequency radiometer having a balanced input is utilized to sense these temperature anomalies along the flight path of the aircraft. The use of a multifrequency system results in a sensor that senses the ambient temperature along the flight path, as well as anomalous temperature regions forward of the aircraft along the flight path. In addition, the power requirements of a radiometer fall within the power capabilities of a modern aircraft power plant. Further, a radiometer beam is not harmful to the eyes of pilots of other aircraft as is a laser beam, for example.

BRIEF DESCRIPTION OF THE DRAWINGS

The foregoing objects and any of the attendant advantages of this invention will become more readily appreciated as the same becomes better understood by reference to the following detailed description when taken in conjunction with the accompanying drawings wherein:

FIG. 1 is a pictorial diagram utilized to describe the ranging theory of operation of the invention;

FIG. 2 is a graphical diagram of the normalized response of a radiometric sensor to a step temperature anomaly as a function of range;

DESCRIPTION OF THE PREFERRED EMBODIMENT

Figure 4:
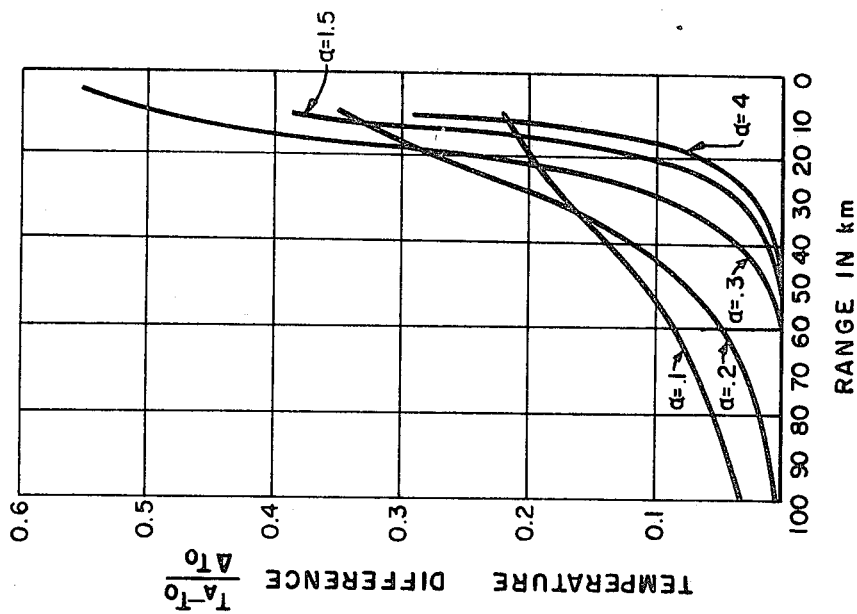
FIG. 4 is a graphical diagram of the normalized response of a radiometric sensor to an exponential temperature anomaly as a function of range.

Prior to describing the preferred embodiment of the invention, the following description of the theory of the operation of the ranging aspects of the invention is presented.

To illustrate the range capability of a radiometric temperature probing system, first consider one frequency of observation (one channel) in which the atmospheric attenuation coefficient determined by the observing frequency is constant throughout the ray path. The antenna temperature for this condition is:

$$T_A = (1 - 1/L)T_o \qquad (1)$$

where $T_A$ = the antenna temperature;
$T_o$ = the ambient temperature along the horizontal flight path at the flight altitude; and
$L$ = the total attenuation of the atmosphere along the flight path The total attenuation L in the above equation must be expressed in a numerical value. It is conventional to refer to the attenuation of the atmosphere in the units of db/km. For example, if the attenuation is one db per kilometer, then in a path 20 km long, forward of the aircraft, the value of $L$ is 20 db (numerical value = 100); and, the value, $T_A$, sensed by the radiometer from this 20 km path, is 99 percent of the value of the ambient temperature at the flight altitude. It is apparent from this simple example that if there is no temperature anomaly along the flight path, then the temperature sensed by the radiometer is the ambient temperature along the flight path.

Next, consider the case in which a temperature anomaly occurs over a small range increment forward of the aircraft. This condition is shown in simplified form in FIG. 1. The radiometer is shown on the far left-hand side of the diagram. The range to the CAT region is $S_1$. The extent of the CAT region is $S_2-S_1$. The column of air beyond the CAT region extends to infinity (for all practical purposes in this analysis).

For the first step in the analysis, assume that the temperature is constant along the entire flight path; i.e., that a CAT temperature anomaly does not exist. However, for ease of analysis, the individual temperature contributions from each of the three regions is hereinafter developed.

$L_1$ = the total attenuation over the path $S_1$;
$L_2$ = the total attenuation over the path $S_2-S_1$; and
$L_3$ = the total attenuation beyond the CAT region.

Then, the contribution to the antenna temperature from the region $S_1$ is:

$$T_{S_1} = \left(1 - \frac{1}{L_1}\right) T_o \qquad (2)$$

obtained directly from Equation (1). The temperature radiated by the CAT region ($S_2-S_1$) is:

$$T_{S_2} = \left(1 - \frac{1}{L_2}\right) T_o \qquad (3)$$

However, this radiated temperature is attenuated as it passes through the path $S_1$; hence, the temperature of the CAT region observed at the sensor is:

$$T_{S_2} = \left(1 - \frac{1}{L_2}\right) \frac{T_o}{L_1} \qquad (4)$$

In a similar manner, the temperature radiated by the region beyond the CAT measured at the far boundary of the CAT region is:

$$T_{S_\infty}' = \left(1 - \frac{1}{L_3}\right) T_o \qquad (5)$$

Since this region is considerably greater in extent than the range increments $S_1$ and $S_2$, the temperature radiated by this region in the direction of the sensor measured at the far boundary of the CAT region will be equal to the ambient, $T_o$. That is:

$$T_{S_\infty}' = T_o \qquad (6)$$

However, the temperature contribution from this region, measured at the sensor, also suffers the attenuation of the CAT region ($S_2-S_1$) and the region $S_1$; hence, the contribution at the sensor is:

$$T_{S_1}, T_{S_2}, \text{ and } T_{S_\infty}. \qquad (7)$$

Therefore, the temperature at the sensor consists of three components: $T_{S_1}$, $T_{S_2}$, and $T_{S_\infty}$. Summing up and simplifying Equations 2, 4, and 7 provides the following result:

$$T_A = \left(1 - \frac{1}{L_1}\right) T_o + \left(1 - \frac{1}{L_2}\right) \frac{T_o}{L_1} + \frac{T_o}{L_1 L_2}$$

$$= T_o - \frac{T_o}{L_1} + \frac{T_o}{L_1} - \frac{T_o}{L_1 L_2} + \frac{T_o}{L_1 L_2} = T_o \qquad (8)$$

As anticipated, the antenna temperature equals the ambient temperature along the flight path consistent with the assumed condition that there was no temperature anomaly in the region $S_2-S_1$.

Now assume a temperature anomaly $\Delta T_o$ is in the region $S_2-S_1$. This change in the analysis is accommodated by noting that $T_{S_2}$ now takes the form:

$$T_{S_2} = \left(1 - \frac{1}{L_2}\right) \frac{T_o + \Delta T_o}{L_1} \qquad (9)$$

which can be rewritten in the form:

$$T_{S_2} = \left(1 - \frac{1}{L_2}\right) \frac{T_o}{L_1} + \left(1 - \frac{1}{L_2}\right) \frac{\Delta T_o}{L_1} \qquad (10)$$

Since the second term in Equation 10 represents the only difference in the summation, relative to the prior condition in which the temperature was considered to be constant throughout the horizontal flight path, then it is apparent that the antenna temperature now sensed by the radiometer takes the form:

$$T_A = T_o + \left(1 - \frac{1}{L_2}\right) \frac{\Delta T_o}{L_1} \qquad (11)$$

Equation 11 can be rewritten in the form:

$$T_A = T_o + \frac{1}{L_1}\left[\left(1 - \frac{1}{L_2}\right) \Delta T_o\right] \qquad (12)$$

Hence, the observed antenna temperature at the sensor consists of two terms, the ambient temperature $T_o$ and the differential temperature radiation of the CAT region, shown in the bracketed term and related directly to Equation 1, attenuated by the passage of this radiation through the region $S_1$ which introduces a loss $L_1$.

Summarizing, Equation 12 can be rewritten in the form:

$$T_A = T_o + \Delta T_C \qquad (13)$$

where:

$$\Delta T_C = \frac{1}{L_1}\left[\left(1 - \frac{1}{L_2}\right) \Delta T_o\right] \qquad (14)$$

Therefore, the observed differential temperature, relative to the ambient temperature is a function of:
a. the temperature anomaly in the CAT region, $\Delta T_o$;
b. the extent in range ($S_2 - S_1$), of the CAT region and the atmospheric attenuation associated with the CAT region as reflected by the value of $L_2$; and,
c. the range to the CAT region $S_1$ from the radiometer and the atmospheric attenuation associated with this path as reflected by the value of $L_1$.

It should be noted at this point that the values of $L_1$ and $L_2$ are not only range dependent, but also dependent on the absorption coefficient ($\alpha$ in db/km) of the medium which is in turn dependent on the frequency of observation. Reference is made to an article entitled, "The Microwave Spectrum of Oxygen in the Earth's Atmosphere," by M. L. Meeks and A. E. Lilley, in Volume 68, No. 6 Edition of the Journal of Geophysical Research, dated Mar. 15, 1963, for a discussion of the dependency of the atmospheric absorption coefficient on frequency of observation at frequencies near 60,000 GHZ.

The following mathematical example more clearly demonstrates the ability of a radiometer to detect a temperature anomaly in range, as a consequence of the difference observed in the values of $\Delta T_C$ as a function of the frequency of observation; i.e., absorption coefficient.

Consider the following conditions:
a. $\Delta T_o = 10°K$
b. $\alpha A = 0.1$ db/dm = attenuation at one frequency
c. $\alpha B = 1.0$ db/km = attenuation at the second frequency
d. Extent of the CAT region ($S_2 - S_1$) = 10 km Using the foregoing values, the temperature radiated by the CAT region at the two frequencies of observation can be computed. The radiated temperature is given by the term in brackets in Equation 14.

These values are listed in Table I.

TABLE I

| $\alpha$ db/km | $(S_2-S_1)$ km | $L_2$(db) | $L_2$(no) | $[(1-1/L_2)\Delta T_o]$ |
|---|---|---|---|---|
| $\alpha A=0.1$ | 10 | 1.0 | 1.26 | 2°K |
| $\alpha B=1.0$ | 10 | 10.0 | 10.0 | 9°K |

The value of $\Delta T_c$ associated with the CAT anomaly as observed at the sensor can now be computed as a function of range to the CAT region by merely introducing the appropriate attenuation of 2°K and 9°K signals over the range $S_1$, remembering, of course, that the attenuation value in either case in db/km must be applied. These values are listed in Table II:

TABLE II

| Range (km) | $\alpha A = 0.1$db/km | | | $\alpha B = 1.0$db/km | | |
|---|---|---|---|---|---|---|
| | $L_1$(db) | $L_1$(no) | $\Delta T_c$ | $L_1$(db) | $L_1$(no) | $\Delta T_c$ |
| 10 | 1.0 | 1.26 | 1.6°K | 10.0 | 10.0 | 0.9°K |
| 50 | 5.0 | 3.15 | 0.65°K | 50.0 | $10^5$ | $10^{-4}$°K |
| 100 | 10.0 | 10.0 | 0.20°K | 100.0 | $10^{10}$ | $10^{-9}$°K |
| 200 | 20.0 | 100.0 | 0.02°K | 200.0 | $10^{20}$ | $10^{-19}$°K |

From Table II it is apparent that at a range of 10km, the frequency with the lowest value of $\alpha$ (i.e., $\alpha A = 0.1$db/km) provides a temperature difference response of 1.6°K, while the frequency with the high value of $\alpha$ (i.e., $\alpha B$) provides a response of only 0.9°K. At 50 km, however, the response in the high $\alpha$ channel is undetectable, while the channel with the low $\alpha$ value provides a response of 0.65°K.

Equation 12 can be rewritten in the form:

$$T_A - T_o/\Delta T_o = 1/L_1 (1 - 1/L_2) \qquad 15$$

The right-hand side of Equation 15 is a function of the $\alpha$ value, the range to the CAT region, and the extent of the CAT region. The left-hand side of Equation 15 is in the form of a normalized temperature response; i.e., the numerator is the difference between the observed antenna temperature and the ambient temperature along the flight path which varies as a function of range. The denominator is the actual thermometric temperature anomaly associated with the CAT region.

Rewriting Equation 15 in prior notation form results in:

$$T_A - T_o/\Delta T_o = \Delta T_c/\Delta T_o \qquad 16$$

In Table II the values of $\Delta T_c$ for two assumed values of $\alpha$, a temperature difference ($\Delta T_o$) of 10°K, and a CAT extent of 10 km was computed. A graphical plot of $\Delta T_c/\Delta T_o$ for the same condition (a step change) is shown in FIG. 2. To convert the normalized value of temperature to a measured value for $\Delta T_c$, the vertical scale only need be multiplied by 10°K. As shown in FIG. 2, the differential temperature, at a range of 100 km for the $\alpha = 0.1$ db/km channel, is 0.2°K; at 50 km, 0.65°K; and at 10 km, 1.6°K. The corresponding response for the $\alpha = 1.0$ db/km channel as a function of range is negligible until the aircraft approaches to within approximately 20 km of the CAT region. At 10 km, the observed temperature difference rises sharply to 0.9°°K. FIG. 2 also includes other frequencies of observation which provide absorption coefficients of 0.2, 0.5, and 1.5 db/km for comparison purposes.

Figure 3:
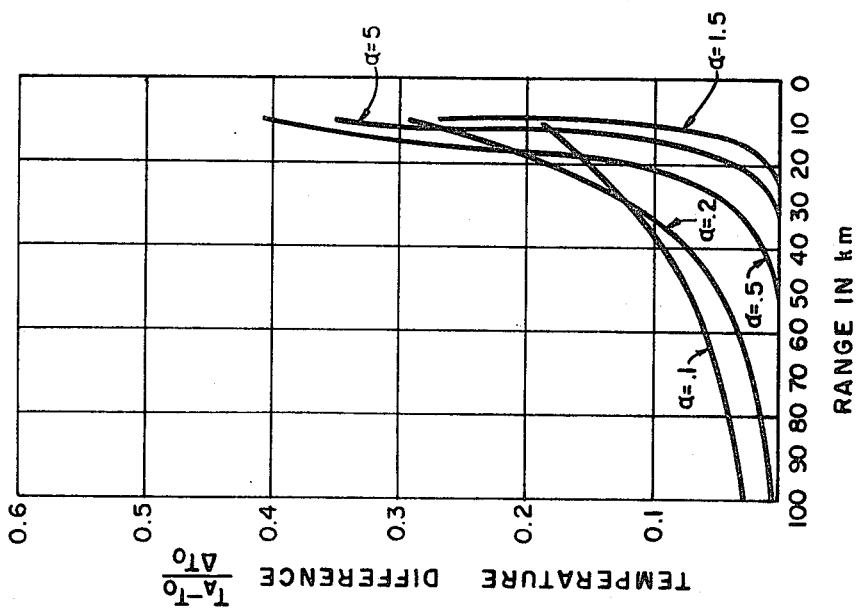
FIG. 3 is a graphical diagram of the normalized response of a radiometric sensor to a ramp temperature anomaly as a function of range.

In the prior example, the temperature anomaly associated with CAT was assumed to be a step-function; i.e., an abrupt change in temperature retaining a constant value throughout the CAT region. For comparison purposes, a graphical plot, similar to FIG. 2 for a ramp temperature increase is illustrated in FIG. 3, and an exponential temperature increase is illustrated in FIG. 4. It is of interest to note that the general form of the response is essentially the same independent of the form of the temperature anomaly.

Figure 5:
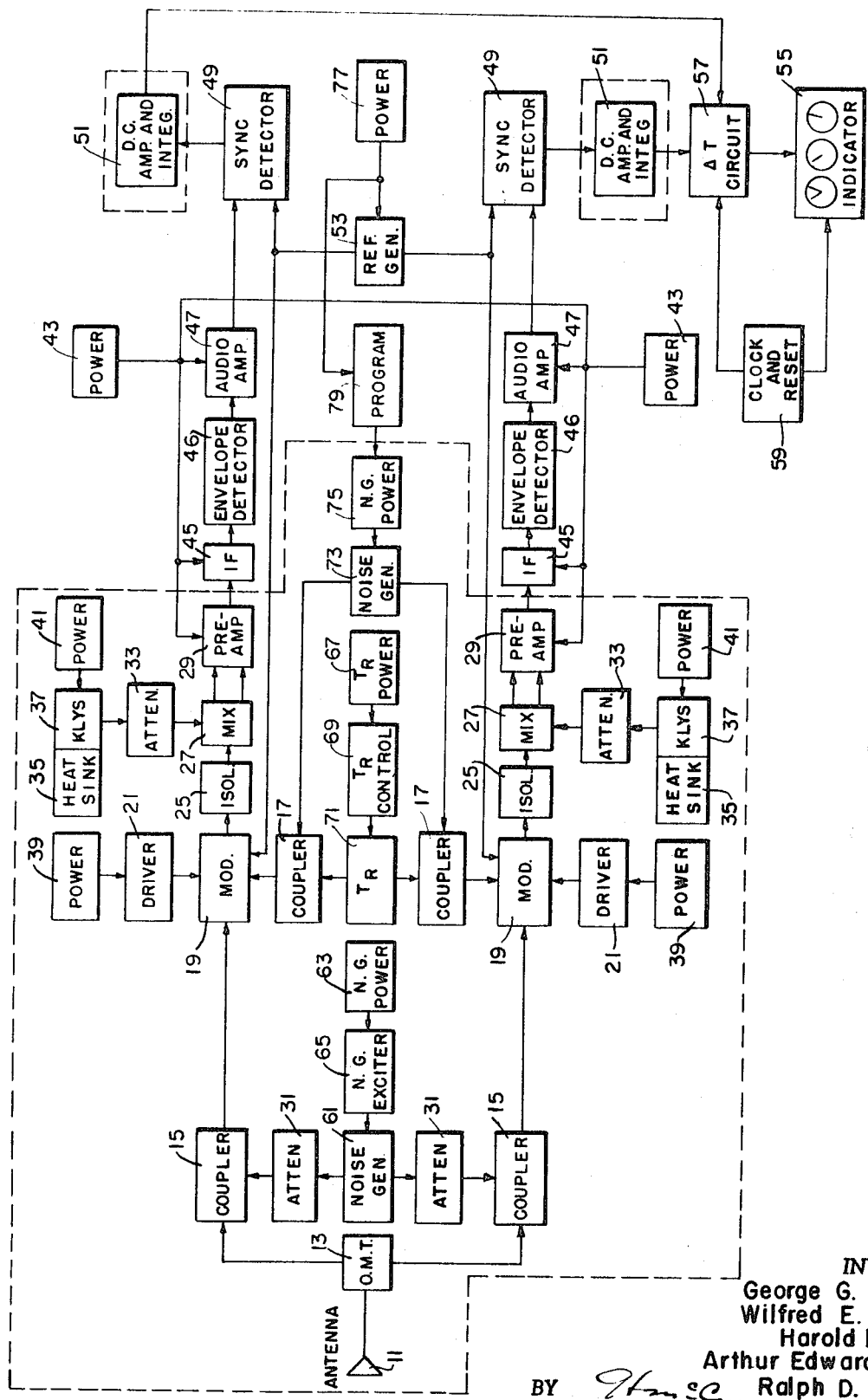
FIG. 5 is a functional block diagram of a preferred embodiment of the invention.

Turning now to a description of the preferred embodiment of the invention illustrated in FIG. 5, an antenna 11, which may be a scanning type, a multibeam type or a single beam type, is connected to an orthogonal mode transducer 13, which allows the signal received by the antenna to be separated into two polarizations. One polarization is separately applied to each of a pair of channels, illustrated in FIG. 5. More specifically, the upper portion of FIG. 5 is devoted to one channel and the lower portion of FIG. 5 is devoted to the second channel. More frequencies or channels may be added if desired to provide a finer range granulation. The region between the two channels in FIG. 5 is devoted to components that are common to both channels.

Each frequency channel of the multifrequency radio-metric sensor shares the antenna 11 and comprises a RF processing section and a signal processing section. The channels also share a common output indicator system which is controlled by a common timing and reset circuit.

Each radiometric RF processing section comprises: first and second side couplers 15 and 17; a modulator 19, including its driver unit 21; an isolator 25; a mixer 27; a preamplifier 29; first and second attenuators 31 and 33; a controlled oven reference (heat sink) 35; a klystron or solid state local oscillator 37; and, first and second power supplies 39 and 41 for the klystron and the modulator driver units 21. Each signal processing section comprises: a third power supply 43; an IF amplifier 45; an envelope detector 46; an audio amplifier 47; a synchronous detector 49; an integrator 51, and a common reference generator 53. An output indicator circuit 55, a $\Delta T$ circuit 57 and a clock and reset circuit 59 are common to all frequency channels.

The signal outputs from the orthogonal mode transducer are connected to one of the inputs of the first coupler 15 of each channel. The first coupler 15 at the front of the modulator 19 allows the addition of noise from a first noise generator 61. This noise is fed to the side inputs of the first coupler 15 via the first attenuator 31. The first attenuator 31 is used to adjust the amount of added noise such that the input signal and added noise equals the input signal appearing at the reference input port of the modulator 19.

The output of the modulator 19 is connected through the isolator 25 to one input of the mixer 27. The klystron 37, which acts as a local oscillator, is tunable and connected so as to receive its input DC power from the power supply 41. The klystron is also mounted so as to apply its heat to the heat sink 35. The RF output of the klystron 37 is connected through the second attenuator 33 to the second input of the mixer 27. The output of the mixer 27 is connected through the preamplifier 29 to the input of the IF amplifier 45. The output of the IF amplifier is connected through the envelope detector 46 to the input of the audio amplifier 47. The power supply 43 is connected to the preamplifier 29, the IF amplifier 45 and the audio amplifier 47 to provide power to those amplifiers. The output from the audio amplifier 47 is connected to one input of the synchronous detector 47. The synchronous detector is switched at the same frequency as the modulator 19.

Also illustrated in FIG. 5 is a calibration section, a reference generating section, and a control section, all of which are common to both channels. The calibration section comprises: a second noise generator power supply 75 and a second noise generator exciter 73.

The reference noise generating section comprises a reference generator power supply and monitor 67, a reference control 69, and a reference temperature dual oven load 71. The output of the reference generator power supply and monitor 67 is connected through the reference control 69 to supply power to the reference temperature dual oven load 71. The dual oven load 71 is connected to inputs of the second couplers 17. The second couplers have their outputs connected to the modulators 19. The purpose of this section is to monitor the gain of each channel of the radiometric sensor so as to detect a temperature difference by subtraction of the two independent receiver channel measurements after normalization of their individual gains by the previously described procedure.

The control section comprises: a power supply 77; and, a program source 79. The power supply 77 is connected to provide power to the reference generator 53 and to the program source 79. The output of the program source is connected to the noise generator power control 75 of the second noise generating section. The reference generator 53 generates two reference signals. One reference signal is applied to the modulator and the synchronous detector of the first channel and the other reference signal is applied to the modulator and the synchronous detector of the second channel.

The output of the synchronous detector 49 of each channel is connected through the DC amplifier and integrator 51 of that channel to separator inputs of the $\Delta T$ circuit 57 forming a part of an indicator network. The indicator network also includes the clock and reset circuit 59 and the indicator 55. The clock and reset circuit 59 generates a clock signal which is applied to the $\Delta T$ circuit 57 and a reset signal that is applied to the indicator 55. The output from the $\Delta T$ circuit 57 is also applied to the indicator 55.

Turning now to a detailed description of the operation of the overall embodiment of the invention illustrated in FIG. 5, each modulator acts as a single-pole, double-throw switch. More specifically, each modulator 19 provides an amplitude modulated noise signal which is proportional to the temperature difference between the noise powers presented to the modulator's input port from the orthogonal mode transducer 13 and to the modulator's comparison port. The reference generator 53 provides the modulation control signal while the power supply 39 provides power to the modulator 19. The RF noise power with the modulated component is amplified at the RF frequency of the channel by the mixer and RF amplifier 27. The RF signal frequency of each channel is determined by the frequency of the signal generated by the klystron and preamplifier frequency. The signal frequency is further amplified by the preamplifier 29 and the IF amplifier 45. Thereafter, the signal is detected in the envelope detector 46. Finally, the envelope signal or modulated component (which is in the audio frequency range) is amplified by the audio amplifier 47.

The audio amplified signal is compared in the synchronous detector 49 with the reference generator signal. The output from the synchronous detector has a voltage level that is proportional to the input temperature difference. The output from the synchronous detector is amplified by the DC amplifier and integrator 51 in order to obtain the average value of the amplitude modulated signal. The outputs from the DC amplifier and integrators of the two channels are compared in the $\Delta T$ circuit 57 and the output from the $\Delta T$ circuit 57 is applied to the indicator to provide an indication of any temperature difference which, as heretofore described, is an indication of a CAT region.

Figure 6:
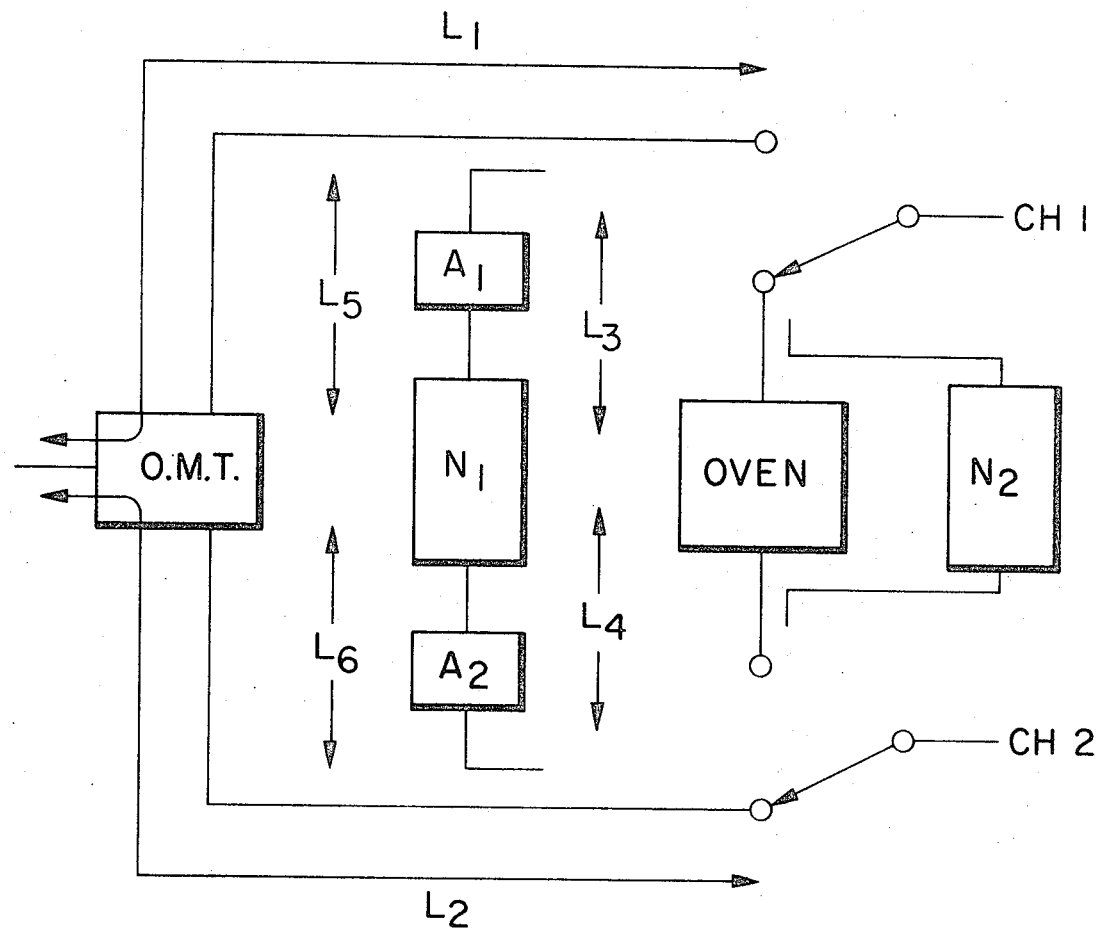
FIG. 6 is a functional block diagram of a modified absolute radiometric mode or temperature difference mode.

The operation of the dual channel sensor illustrated in FIG. 5 and generally described above is based upon a modification of the absolute power measurement concept described in U.S. Pat. Application Ser. No. 686,248 for "Method and Apparatus for Providing an Absolute Power Measurement Capability," by George Haroules, et al, filed Nov. 28, 1967, now U.S. Pat. No. 3,564,420. The invention described in that patent application is a passive circuit that is connected at the input of a relative power measurement radiometer to provide an absolute power measurement capability. This invention varies the circuit described in the foregoing patent application by only introducing a first noise generator 61, a first attenuator 31, and a first coupler 15 prior to the modulator 19. The first noise generator 61 is excited by the first noise generator exciter 65 and its power supply 63. The purpose of this modification is to inject an amount of noise which when added to the input signal such that the sum appearing at the signal port of the modulator 19 balances the signal appearing at the reference port of the modulator 19. The reference port is the port coupled through the coupler to the reference noise generator 53. A functional block diagram of the RF balance circuit of the invention is illustrated in FIG. 6. This circuit is the key feature of the invention in that two or more channels are modified such that a normalized power subtraction is achieved.

With the foregoing modification, the radiometer is balanced when the antenna views the ambient temperature along the flight path. In the modified absolute mode it will measure a temperature difference $\Delta T_o$ from an ambient temperature $T_o$.

It should be noted that an important teaching of the invention is illustrated by the dashed lines of FIG. 5 surrounding various sub-sections of the invention. That is, the dashed lines illustrate that all of the RF components are at the same temperature. By maintaining all of the RF components at the same temperature, the summation of terms making up transmission signal path losses of prior art devices are made time invarient and hance allow the calibration and balance of the system to be independent of time.

The program 79 controls the programming of the generation of noise from the second noise generator 73 by controlling the noise generator power supply 75. The couplers couple the noise sources and the signals (either the signal from the orthogonal mode transducer 13 or the reference signal from the reference 71) to the modulator 19. The $\Delta T$ circuit 57 compares the signals representing the change in ambient temperature so that an indication of the occurrence of a CAT region can be provided to the indicator. The indicator 55 is adapted to indicate the distance from the aircraft to a temperature anomaly associated with a clear air turbulence region. The $\Delta T$ circuit 57 indicates the occurrence of distance to a clear air turbulence region by comparing the output of the radiometric channels.

The signal amplitude received from the anomalous temperature region increases as the sensor approaches the region of the phenomenon. The amount of the temperature anomaly that fills the main beam (filling factor) determines the magnitude of the received signal together with the differential temperature and range extent of the CAT region.

It will be appreciated from the foregoing description that the invention is a dual channel radiometric sensor suitable for sensing and detecting atmospheric temperature anomalies associated with clear air turbulence regions in accordance with the theory presented. It will also be appreciated that various modifications can be made within the scope of the teachings of the invention. For example, it may be desirable to have more than two channels so that simultaneous measurements at various ranges can be accommodated along the forward path of the aircraft during flight. In this manner, various distance indications of clear air turbulence regions can be provided. Consequently, alert, critical or other indicating warnings can be provided to the pilot so that he can take the appropriate evasive action to avoid CAT regions. Hence, the invention can be practiced otherwise than as specifically described herein.

What is claimed is:

1. A clear air turbulence detector comprising:
   a multifrequency radiometer means having a plurality of channels for generating radiometric probes at predetermined frequencies and for generating output signals for each channel, said output signals being related to the anomalous temperature characteristics of the regions being probed;
   indicating means connected to said multifrequency radiometer means for sensing the output signals from said channels and for displaying said output signals in a predetermined manner;
   an antenna connected to said multifrequency radiometer means;
   said multifrequency radiometer means includes two channels, each of said channels including:
   a radiometer processing section connected to said antenna for processing the signals received by said channels so as to generate output signals for differential power comparison;
   a signal processing section connected to said radiometric processing section for processing signals from said radiometric processing section and for generating a processed signal related to the range to said regions of atmospheric temperature anomalies being probed; and an orthogonal mode transducer connected to said antenna to receive signals from said antenna and to said radiometric processing sections to apply the received signals to said radiometric processing section.

2. A clear air turbulence detector for probing the atmosphere to detect atmospheric temperature anomalies associated with clear air turbulence regions, including a plurality of radiometric channels, wherein each of said channels comprises:

an RF processing means adapted to receive RF signals related to the temperature and altitude of regions being probed;

a signal processing means connected to said RF processing means for processing the signals processed by said RF processing means so as to obtain a signal including information about the range to anomalous temperature regions along the forward flight path of high performance aircraft;

indicating means connected to said signal processing means for interpreting the signals generated by said signal processing means and for displaying information about the occurrence of clear air turbulence regions; and a calibration means connected to said RF processing means for balancing the output of said RF processing means when a clear air turbulence region is not being probed.

3. A clear air turbulence detector as claimed in claim 2, wherein said calibration means includes a noise generator.

4. A clear air turbulence detector as claimed in claim 3, including a reference noise generating means adapted to generate a reference noise signal, said reference noise generating means being connected to said signal processing means and said RF processing means for applying a reference noise signal to said signal processing means and said RF processing means.

5. A clear air turbulence detector as claimed in claim 4, including a control means connected to said reference noise generating means for controlling the noise generated by said reference noise generating means.

6. A clear air turbulence detector as claimed in claim 5, including an antenna means connected to the inputs of said RF processing means for receiving RF signals and applying the received RF signals to said RF processing means.

7. A clear air turbulence detector as claimed in claim 6, including signal splitting means connected to said antenna means and to said RF processing means for splitting the RF signal received by said antenna means and applying said signals to said RF processing means.

* * * * *